UNITED STATES PATENT OFFICE.

ROBERT F. GARDINER, OF CLARENDON, VIRGINIA.

PROCESS FOR THE PRODUCTION OF AN AVAILABLE PHOSPHORIC ANHYDRID AND POTASH FERTILIZER.

1,282,805.  Specification of Letters Patent.  Patented Oct. 29, 1918.

No Drawing.  Application filed May 29, 1918. Serial No. 237,280.

(DEDICATED TO THE PUBLIC.)

*To all whom it may concern:*

Be it known that I, ROBERT F. GARDINER, a citizen of the United States, residing in Clarendon, Alexandria county, Virginia, (whose post-office address is Department of Agriculture, Washington, D. C.,) have invented a new and useful Process for the Production of an Available Phosphoric Anhydrid and Potash Fertilizer.

This application is made under the act of March 3, 1883, chapter 143 (22 Stat. 625), and the invention herein described and claimed may be used by the Government of the United States, or any of its officers or employees, in the prosecution of work for the Government, or any person in the United States, without payment to me of any royalty thereon.

One of the objects of my invention is to utilize the calcium chlorid, which is a waste by-product in many chemical industries, in producing a fertilizing material containing available phosphoric anhydrid and potash, when fused with phosphoric anhydrid and potash bearing minerals. Another object is to utilize relatively inexpensive materials for the production of available phosphoric anhydrid and potash by direct comparatively low temperature heat treatment, and at the same time recover valuable distillation products from waste wood. A further object of my invention is to obtain a means of releasing valuable fertilizer elements, such as phosphoric anhydrid and potash, from minerals which could not be economically treated by acid extraction.

The advantages of my invention are:

The production of a mixed fertilizer, by direct heat treatment, containing a considerable proportion of the total phosphoric anhydrid and potash in an available condition when applied directly to the soil.

Refractory high grade phosphoric anhydrid and potash bearing minerals like apatite and orthoclase can be used for the production of available phosphoric anhydrid and potash.

In the practice of my invention I mix waste calcium chlorid with finely ground dried wood waste or sawdust, and with phosphoric anhydrid and potash bearing minerals which have been ground to about 100 mesh. The mixture is then placed in a suitable retort or container and destructive distillation at a bright red heat of the wood carried on until the residue within the retort has been in a fused state or condition for about one hour's time.

The distillates can be treated in the usual way for the recovery of acetone, acetic acid and other by-products.

When a battery of retorts or containers have been cooled, the cakes or residues in them may be removed and ground to any suitable degree of fineness.

Volatilized potash can be recovered by any of the well known methods of settling chambers provided with either mechanical or electrical devices.

Having thus described my invention, I claim:

1. A process of heating a mixture of calcium chlorid, and phosphoric anhydrid and potash bearing minerals together with wood waste, like sawdust at a bright red heat to obtain a mixed fertilizer containing available phosphoric anhydrid and potash.

2. A process for producing phosphoric anhydrid and potash consisting in heating a mixture of calcium chlorid and phosphoric anhydrid and potash bearing minerals together with wood waste, like sawdust at a bright red heat.

3. A process for producing phosphoric anhydrid and potash fertilizer consisting in grinding phosphoric anhydrid and potash bearing minerals, mixing said ground minerals with calcium chlorid, wood waste, like sawdust and heating the mixture at a bright red heat.

In testimony whereof I affix my signature in the presence of two subscribing witnesses.

ROBERT F. GARDINER.

Witnesses:
M. S. ANDERSON,
JOSEPH G. SMITH.